United States Patent
Viti

(10) Patent No.: US 7,525,268 B2
(45) Date of Patent: Apr. 28, 2009

(54) CONTROL DEVICE FOR AN ELECTRIC MOTOR AND RELATED METHOD

(75) Inventor: Marco Viti, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 187 days.

(21) Appl. No.: 11/735,184

(22) Filed: Apr. 13, 2007

(65) Prior Publication Data

US 2007/0241718 A1    Oct. 18, 2007

(30) Foreign Application Priority Data

Apr. 14, 2006    (IT)    ............................ MI2006A0752

(51) Int. Cl.
*H02P 23/12*    (2006.01)
(52) U.S. Cl. ................................. 318/400.14
(58) Field of Classification Search .................. 318/700, 318/400.14, 400.35, 400.34, 799, 430, 777, 318/775

See application file for complete search history.

(56) References Cited

U.S. PATENT DOCUMENTS

2001/0011877 A1*    8/2001    Lelkes et al. ................. 318/700

* cited by examiner

*Primary Examiner*—Karen Masih
(74) *Attorney, Agent, or Firm*—Lisa K. Jorgenson; Robert Iannucci; Seed IP Law Group PLLC

(57) ABSTRACT

A control device controls an electric motor that includes a winding and generates a back electromotive force. The device comprises a first circuit suitable for setting time periods each centered on the time instant of an expected zero crossing of the winding current and a second circuit suitable for generating a signal representing the polarity in the winding in the time periods. The first and second circuits are suitable for providing samples of the polarity signal. The control device comprises a counting circuit suitable for counting the samples of the polarity signal and a further circuit receiving the count and being suitable for deducing the distance between the time instant of the expected zero crossing and the actual zero crossing instant; the further means is suitable for determining the phase shift between the driving voltage of the electric motor and the induced back electromotive force based on the distance.

16 Claims, 4 Drawing Sheets

CONTROL DEVICE FOR AN ELECTRIC MOTOR AND RELATED METHOD

BACKGROUND

1. Technical Field

The present invention relates to a control device for an electric motor and related method.

2. Description of the Related Art

A direct current brushless motor consists of a permanent magnet and of a stator consisting of a certain number of windings (generally three) that are normally star or polygon connected (for example triangle or delta connected). The windings are driven through a driving circuit the output stage of which generally comprises a half bridge (two bipolar or MOS transistors) for each winding.

FIG. 1 shows a typical circuit diagram of an output stage 1 and a motor 2 connected thereto with three configured star phases; the motor is indicated by three star-connected windings La, Lb and Lc. Detecting the rotor position during rotation generally requires the output stage of a winding of the motor to be placed in high impedance status, for example the output stage of the winding La, and a circuit 3 to be used that is suitable for detecting a Pbemf signal that represents the polarity of the induced back electromotive force (BEMF) of said winding in order to be able to detect the zero crossing (Zero Crossing or ZC) of the BEMF. This is an indication of the instantaneous position of the rotor, whilst speed is calculated simply as the temporal distance of the last two ZC readings. These data are thus those used for driving the motor in a synchronous manner.

BRIEF SUMMARY

One embodiment of the present invention is a control device for an electric motor that is better than known devices.

One embodiment of the present invention is a control device for an electric motor, said electric motor comprising at least one inductive winding and being voltage driven and generating a back electromotive force, said device comprising first means suitable for setting periods of time each centered on the instant of time in which the zero crossing of the current in the winding is expected and second means suitable for generating a representative signal of the polarity of the current in said winding in said periods of time, characterized in that said first and second means are suitable for providing samples of said polarity signal in said periods of time and in that it comprises counting means suitable for counting said samples of the polarity signal in said periods of time and further means having at the input the result of said count and being suitable for deducing the distance of the instant of time in which the zero crossing of the current in the winding is expected from the actual zero crossing instant of the current, said further means being suitable for determining the phase shift between the driving voltage of the electric motor and the induced back electromotive force in function of said distance.

Still according to the present invention it is possible to provide a control method as defined in claim 6.

BRIEF DESCRIPTION OF THE SEVERAL VIEWS OF THE DRAWINGS

The features and advantages of the present invention will become clear from the following detailed description of a practical embodiment thereof, shown by way of non-limiting example, in which.

DETAILED DESCRIPTION

Figure 1:
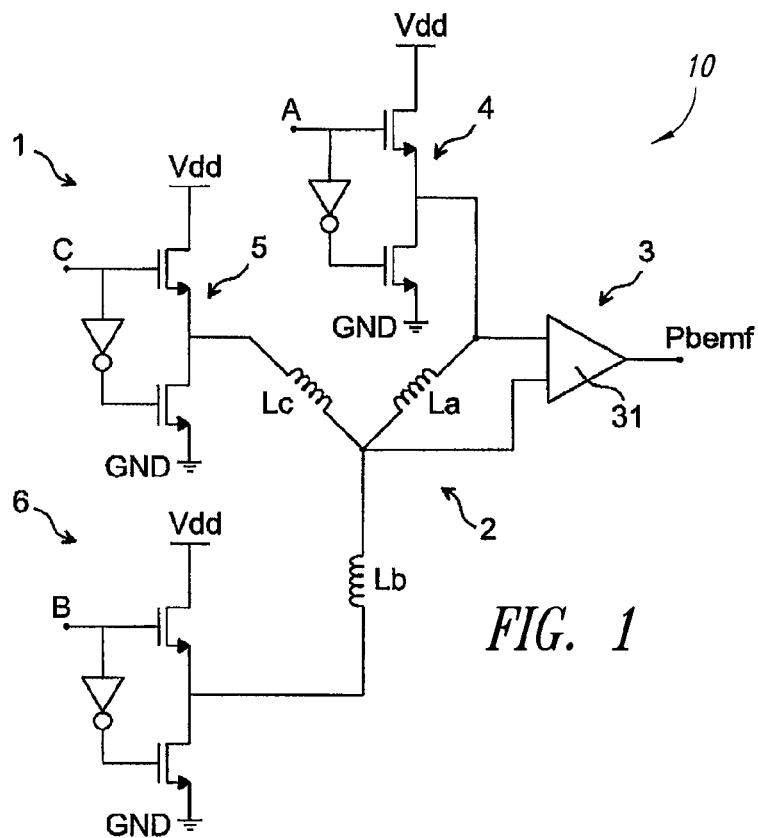
FIG. 1 is a diagram of an output stage of a driving device of a brushless motor and a device for measuring the polarity of the BEMF.
Figure 2:
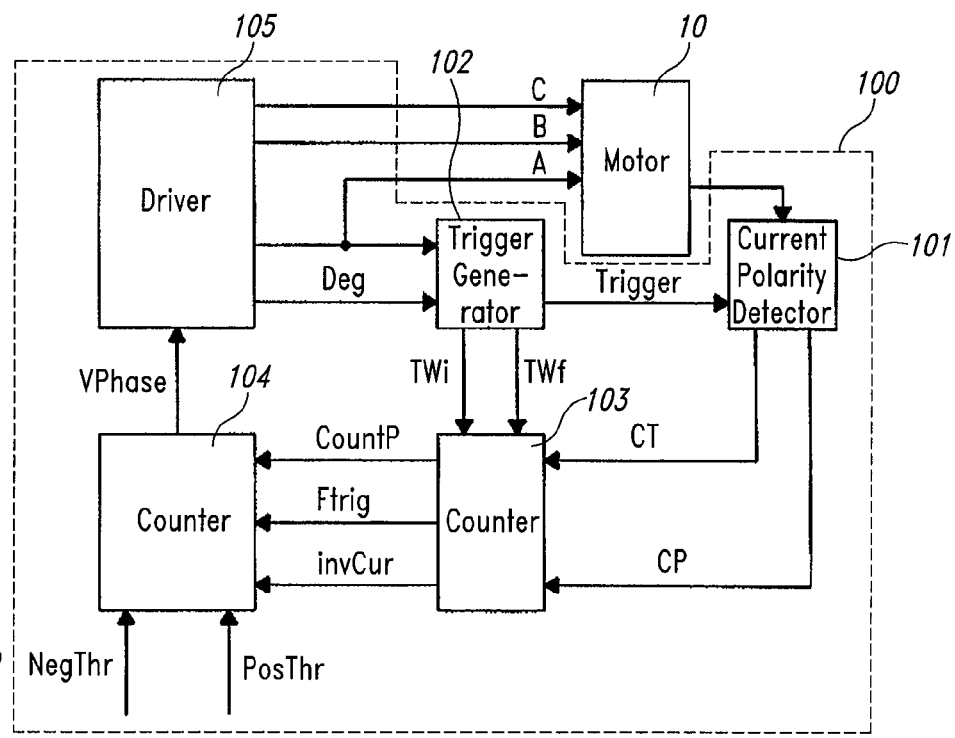
FIG. 2 is a diagram of a system for driving an electric motor comprising a control device.

With reference to FIG. 1, there is shown a system for driving an electric motor comprising a control device. In FIG. 2, with 10 there is indicated a circuit block shown in FIG. 1; said circuit block comprises an output stage 1 of a driving circuit and an electric motor 2, preferably of brushless type, having three star-connected windings La-Lc. The output stage generally comprises three half bridges 4-6 each consisting of a pair of high-side and low-side transistors arranged between a supply voltage VDD and ground GND.

The driving system in FIG. 2 comprises a control device 100. The latter comprises a circuit block 101 and is suitable for measuring the polarity of the current that flows into a winding of the motor and is suitable for providing a polarity signal of the current. Said device comprises a comparator having an input terminal connected to a winding terminal, for example the winding La, which is connected to the output of the respective half bridge 4 whilst the other input terminal of the comparator is connected to an intermediate voltage reference between the supply voltage VDD and ground GND. In PWM (Pulse Width Modulation) driving mode, in the passage moments between the switching-off of the low side transistor and switching-on of the high side transistor and vice versa, i.e., in the moments in which both the transistors are switched off and the half bridge 4 floats, the voltage detected at the input terminals of the comparator is directly dependent on the polarity of the current that flows thereinto. The current in said winding La may flow from the motor to the output stage and to the supply through the parasite diode of the high side transistor of the corresponding half bridge or can flow from the output stage to the electric motor; the reversal of the flow direction of the current defines the zero crossing of the current. The circuit block 101 receives in input a Trigger signal coming from a trigger generator 102; the Trigger signal is a signal consisting of a series of pulses for a set period of time TW of the cycle time period Tc and has a zero value in the other instants of time. The Trigger signal enables sampling of the polarity signal of the current only for the period of time TW, obtaining the signal CP, which is effectively sampled in instants of time marked by pulses on the signal CT. The period of time TW is proportional to a signal Deg coming from a device 105 suitable for driving the motor 10; the signal Deg is proportional to a portion of electrical revolution traversed by the current.

The circuit block 101 sends to a device 103 the signal CP and the signal CT arising from the series of pulses of the Trigger signal in the period of time TW.

The latter comprises a counter suitable for counting the recorded polarities, both the negative polarities and the positive polarities, within the period of time TW. For this purpose the circuit block 102 provides the device 103 with the initial TWi and final TWf instants of the period of time TW. The period of time TW is centered on the expected instant EIZ of the zero crossing of the current; this count provides an indication of how much the expected zero point EIZ of the current differs from the actual zero crossing IZ.

Figure 3:
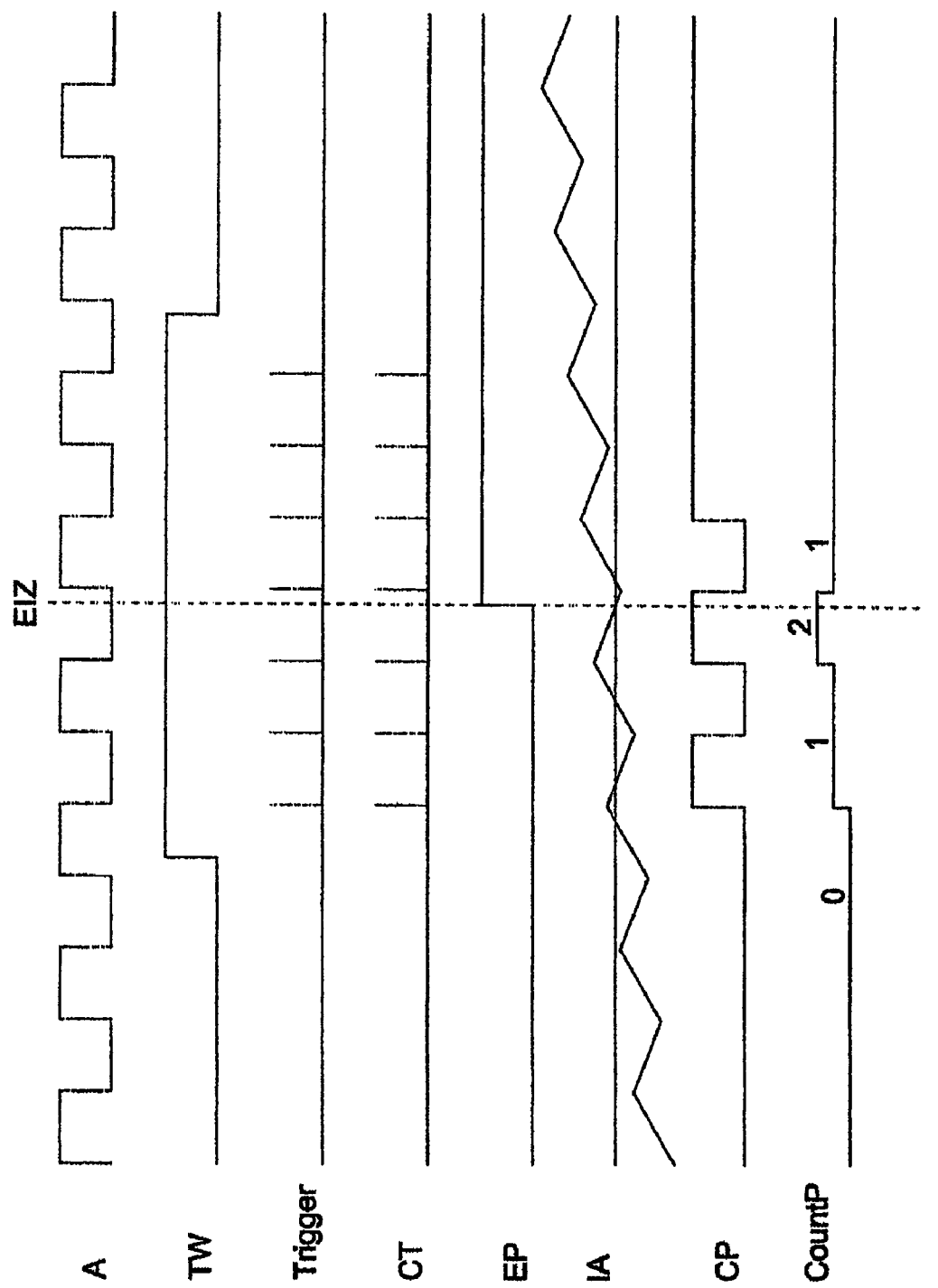
FIG. 3 shows time diagrams of the signals in the system in FIG. 2.
Figure 4:
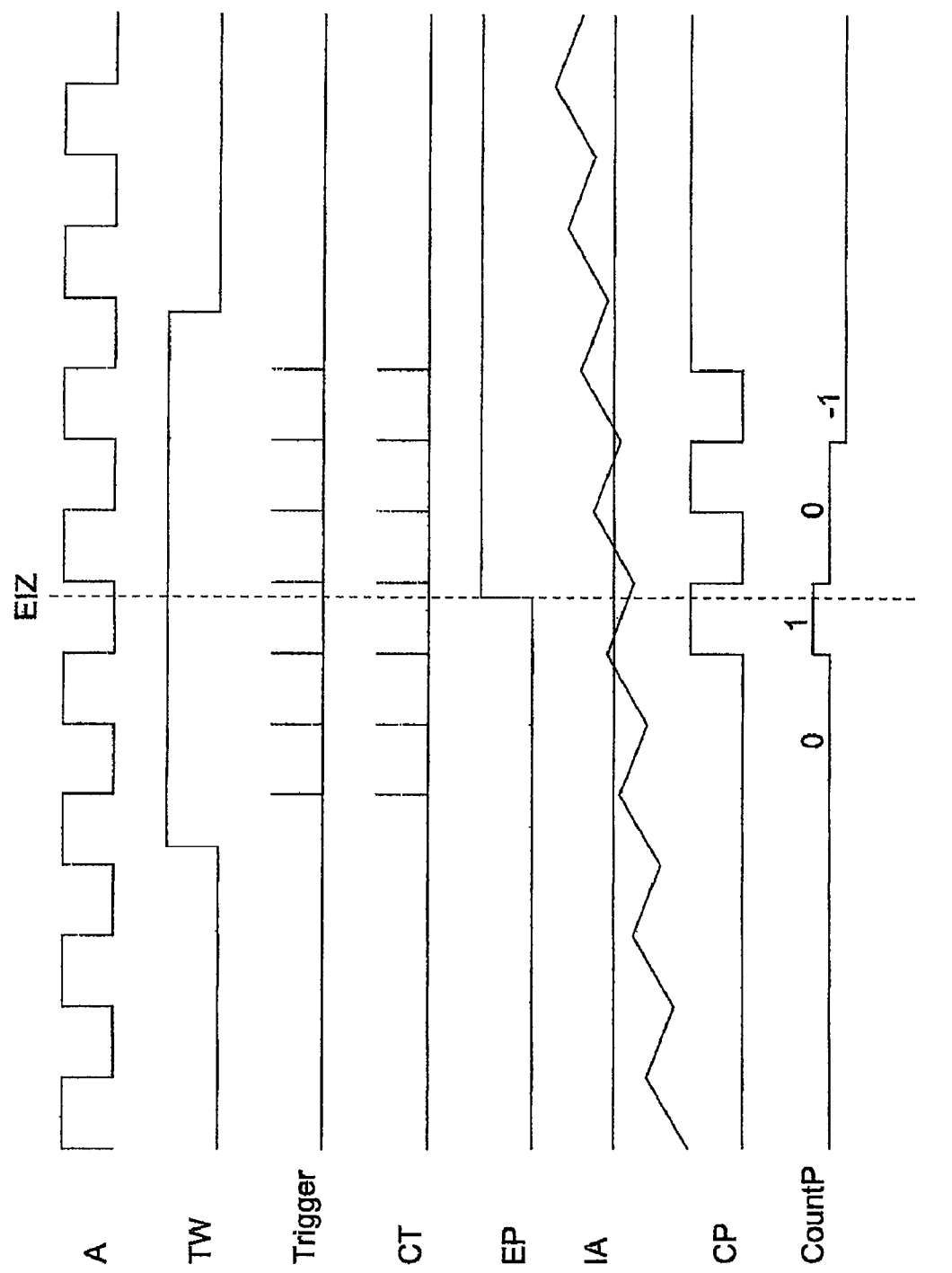
FIG. 4 shows other time diagrams of the signals in the system in FIG. 2.

This count can be managed in various ways: for example by increasing each time the input polarity is positive and decreasing if the current sign is negative. As for each sampling there is an expected polarity (for example positive before the expected zero crossing and negative after this point) it is, for example, possible to act by not counting at all the samples but only in the presence of "unexpected" samples: continuing the example, it would be possible to increase only in the presence of negative samples before the expected zero-crossing EIZ and decrease only in the presence of positive values after that point. In all cases, by assuming the period TW to be placed symmetrically around the point EIZ, if IZ and EIZ are sufficiently aligned the final count (upon the expiry of TW) will be near the value 0. In particular, if the final value of the counter is positive, this will mean that IZ has occurred before the expected point EIZ (as visible in FIG. 3) and vice versa, if the final value is negative this will indicate that the instant IZ is later than the instant EIZ (as visible in FIG. 4). In these figures TW represents the period in which the polarity of the current is sampled (in this case it is deemed to be symmetrical with respect to the expected zero EIZ), the Trigger signal indicates a possible moment in which the polarity of the current can be detected whilst CT indicates the moment in which the polarity CP was detected and the value of the counter 103 can therefore be changed. There are also represented a possible current IA passing through the winding La and the expected sign EP thereof, the command signal A and the signal CountP from the block 103. In the time diagram proposed here, the counting technique is adopted only in the case of an unexpected current sign.

In this context also a current shifted by 180 degrees with respect to what was expected should give a final count of 0, erroneously indicating an optimal coincidence between IZ and EIZ. In this case, assuming TW to be properly dimensioned in terms of temporal duration, it can be remedied by recording the polarity of the current both at the start and end of TW: even if the samples were not as expected, this would mean that there was a reversal of current polarity. In this case, regardless of the final value of the counter, a reversed polarity error would be reported.

Figure 5:
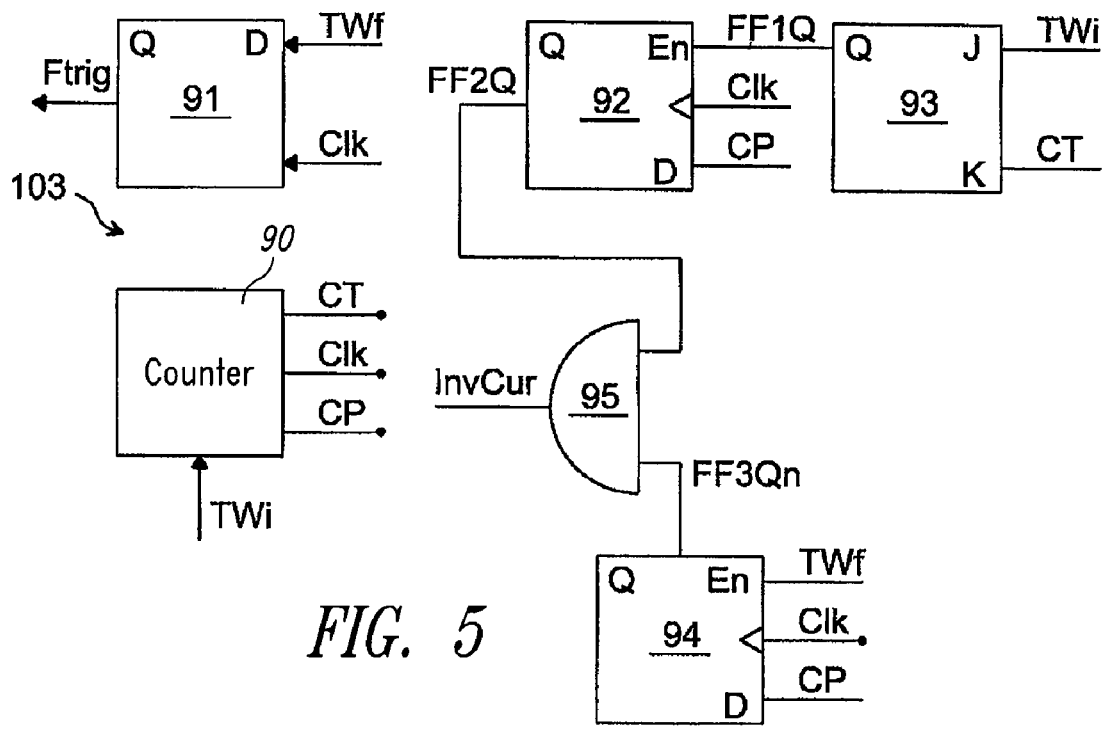
FIG. 5 shows a possible implementation of a circuit block inside the system in FIG. 2.
Figure 6:
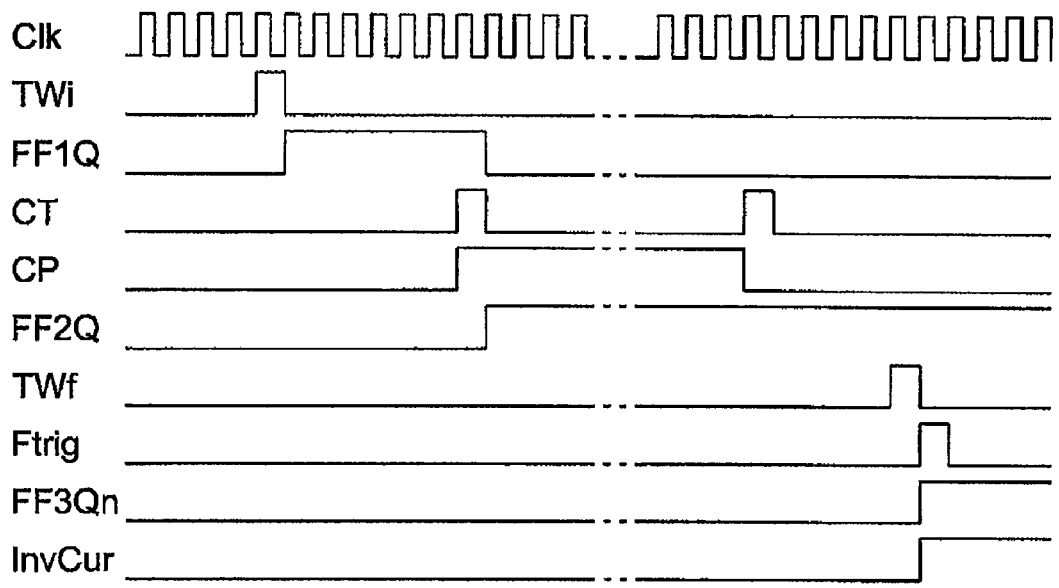
FIG. 6 shows the time diagrams of the signals in the circuit implementation in FIG. 5.

A possible implementation of the block 103 is shown in FIG. 5; said block 103 comprises a two-way counter 90 having in input the signals CT (suitable for enabling the count) and CP (suitable for determining the direction of the count) and the clock signal Clk; the counter 90 will be reset at the start of the period TW (by the signal TWi) whilst within this zone the value thereof will increase or decrease in function of the polarity detected at the sampling moment (in this embodiment, counting takes place in the presence of each current sample and not only in the case of an unexpected value). The block 91, which has in input the signals TWf and Clk, is dedicated to reporting when the counter shows the final value of the count: the signal Ftrig performs this task. In accordance with a possible method of determining the phase reversal of the current the signal InvCur from the block 103 will be high when both the first sample of the current following the start of the zone TW and the last sample have unexpected polarities. According to this method, it is possible to use a first flip-flop 94 having as an enabling signal En the signal TWf, as an input D the signal CP and having in input the signal Clk; the considered output of the flip-flop 94 is the signal FF3Qn, i.e., the negated output. Still according to this method it is possible to use a second flip-flop 93 having as a signal J, forcing the output at the high logic level, the signal Twi and as a zero input K of the output the signal CT; the output of the flip-flop 93 is the signal FF1Q that is in input to the flip-flop 92 having as an enabling signal En the signal FF1Q, as input D the signal CP and having in input the signal Clk; the flip-flop output 92 is the signal FF2Q. The signals FF2Q and FF3Qn are inputs to a port AND 95 having in output the signal InvCur. FIG. 6 shows the waveforms of the signals in play in the block 103. As there is now a parameter indicating how good the alignment is between the actual zero crossing of current IZ and the expected current EIZ, this value CountP is usable for re-phasing the driving voltage (to bring it forward or delay it) in order to bring the final counter value as close as possible to 0 and therefore the shift a between the driving current and the instantaneous position of the rotor as close as possible to the desired position. In order to reach this the expected value IZC must have a well known angular position (for example zero phase shift) with respect to the zero crossing ZC of the BEMF and therefore the block 102 has to suitably generate the signals TWi and TWf centered on the IZC taking advantage of the signal Deg coming from the block 105 and representing in real time the instantaneous position in the scanning of the driving profile over the entire electrical revolution (from 0 to 360 degrees).

The circuit block 104 (FIG. 2) has in input the signals CountP, Ftrig and InvCur; said block 104 is suitable for deducing the distance of the instance of time EIZ in which the zero crossing of the current in the winding from the actual zero crossing instant IZ, of the current is expected. The circuit block 104 processes the value that the counter assumes at the end of the period TW with a type of filtering deemed to be appropriate to the specific application both in terms of implementing and performance costs: the simplest form of processing but which also proves to have suitable performance is a simple sum block ±1. This implementation can involve the use of a further simple counter of the Up/Down type that will be increased by 1 if, when the signal Ftrig reports the end of the count the signal CountP shows that the current is delayed with respect to the expected current and will be decreased by 1 if the current is early; said counter will remain at its own value if the value IZ is near the expected value EIZ, i.e., if the value CountP is within the values of the positive threshold PosThr and within the values of the negative threshold NegThr. This control function of the value of CountP within the set interval can be performed by a suitable block the output of which will effectively enable the counter only if the value of CountP is outside the interval between the values PosThr and NegThr at the moment in which the signal FTrig reports the end of the count. Further, it can be envisaged that even in the event of detection of a current that is reversed in relation to the expected current (by means of the InvCur signal) this does not entail any count by the counter. In the event of an enabled count the final value CountP sign will determine whether the counter will be increased or decreased.

The circuit block 104 is suitable for determining a phase shift between the driving voltage of the electric motor and the induced back electromotive force in function of the distance of the instant of time EIZ in which the zero crossing of the current in the winding from the actual zero crossing instant IZ of the current is expected. This phase shift, processed by the counter of the block 104, will be communicated through the value VPhase to the block 105, suitable for driving the motor 10. The block 105 will act according to any prior-art method so that the driving voltage set at the windings is shifted proportionally to the VPhase with respect to the BEMF. The Vphase signal must control the phase relation between driving voltage and the BEMF, i.e., if necessary it must bring forward or delay the profile of the driving voltage with respect to the BEMF.

What has been disclosed here for a winding is extendible to all the windings of the motor, it thus being possible to bring about a faster convergence on the desired driving phase shift.

From the foregoing it will be appreciated that, although specific embodiments of the invention have been described herein for purposes of illustration, various modifications may be made without deviating from the spirit and scope of the invention.

The invention claimed is:

1. A control device for controlling a rotor of an electric motor that includes an inductive winding, said device comprising:
   first means for setting periods of time each centered on an instant of time in which a zero crossing of a current in the winding is expected;
   second means for generating a polarity signal that is representative of a polarity of the current in said winding in said periods of time, wherein said first and second means are suitable for providing samples of said polarity signal in said periods of time;
   counting means for producing a count resulting from counting said samples of the polarity signal in said periods of time; and
   further means having in input said count and being for deducing a distance between the instant of time in which the zero crossing of the current in the winding is expected an actual zero crossing instant of the current, said further means being for causing a phase shift between a driving voltage of the electric motor and a back electromotive force induced based on said distance.

2. The device according to claim 1, wherein said counting means increases the count by a given quantity when each polarity sample is greater than a threshold value and decreases the count by said given quantity when each polarity sample is less than the threshold value.

3. The device according to claim 1, wherein said counting means comprises memory means suitable for storing values of the polarity samples at initial and final instants of each period of time, said counting means being for emitting a reversal signal if said values of the polarity samples at the initial and final instants of said period of time are not the same as expected values.

4. The device according to claim 1, wherein said further means comprises means suitable for testing whether said count falls within or outside a preset range of values and a counter suitable for being decreased or increased if the count falls outside said range of values.

5. The device according to claim 1, wherein said electric motor is a brushless motor.

6. A control method, comprising:
   controlling an electric motor that includes an inductive winding, the controlling including:
      setting periods of time each centered on an instant of time in which a zero crossing of a current in the winding is expected;
      generating a signal that is representative of a polarity of the current in said winding in said periods of time;
      sampling said polarity signal in said periods of time;
      producing a count by counting said samples of the polarity signal;
      deducing a distance between the instant of time in which the zero crossing of the current in the winding is expected and an actual zero crossing instant of the current based on the count; and
      determining a phase shift between a driving voltage of the electric motor and an induced back electromotive force based on said distance.

7. An electric motor, comprising:
   an inductive coil driven by a drive voltage and structured to generate a back electromotive force; and
   a control device structured to control the inductive coil, the control device including:
   a sampling circuit structured to generate a signal representing current flowing through the coil, the signal including samples during a period of time centered on an expected instant of time at which the current flowing through the coil is expected to be zero;
   a counter coupled to the sampling circuit and structured to produce a count value by counting the samples;
   a controller having an input coupled to the counter and structured to determine a distance between the instant of time at which the current flowing through the coil is expected to be zero and an actual instant of time at which the current flowing through the coil is zero, the controller being structured to determine a phase difference between the drive voltage and the back electromotive force, based on the distance determined by the controller.

8. The motor according to claim 7, wherein said counter is structured to increase the count value by a given quantity when each polarity sample is greater than a threshold value and decrease the count value by said given quantity when each polarity sample is less than the threshold value.

9. The motor according to claim 7, wherein said counter includes a memory circuit structured to store values of the polarity samples at initial and final instants of each period of time, said counter being structured to emit a reversal signal if said values of the polarity samples at the initial and final instants of said period of time are not the same as expected values.

10. The motor according to claim 7, wherein said controller is structured to test whether said count falls within or outside a preset range of values and includes a counter structured to be decreased or increased if the count value falls outside said range of values.

11. The motor according to claim 7, wherein said motor is a brushless motor.

12. The motor according to claim 7, further comprising:
   a currently polarity detector structured to generate a polarity signal representing a polarity of current flowing through the coil; and
   a logic circuit structured to emit a reversal signal if values of the polarity samples at initial and final instants of said period of time are not the same as expected values, the logic circuit including:
   a J-K flip-flop having a first input for receiving the polarity samples, a second input for receiving a pulse indicative of the initial instant of said period of time, and an output;
   a first D flip-flop having an enable input coupled to the output of the J-K flip-flop, a D input coupled to the polarity signal, and an output;
   a second D flip-flop having an enable input for receiving a pulse indicative of the final instant of said period of time, a D input coupled to the polarity signal, and an output; and
   an AND gate having first and second inputs respectively coupled to the outputs of the first and second D flip-flops, and an output at which the reversal signal is produced.

13. The device according to claim 1, further comprising a logic circuit structured to emit a reversal signal if values of the samples at initial and final instants of said period of time are not the same as expected values, the logic circuit including:
- a J-K flip-flop having a first input for receiving the samples, a second input for receiving a pulse indicative of the initial instant of said period of time, and an output;
- a first D flip-flop having an enable input coupled to the output of the J-K flip-flop, a D input coupled to the polarity signal, and an output;
- a second D flip-flop having an enable input for receiving a pulse indicative of the final instant of said period of time, a D input coupled to the polarity signal, and an output; and
- an AND gate having first and second inputs respectively coupled to the outputs of the first and second D flip-flops, and an output at which the reversal signal is produced.

14. The method according to claim 6, further comprising increasing the count by a given quantity when each polarity sample is greater than a threshold value and decreasing the count by said given quantity when each polarity sample is less than the threshold value.

15. The method according to claim 6, further comprising:
- storing values of the polarity samples at initial and final instants of each period of time; and
- emitting a reversal signal if said values of the polarity samples at the initial and final instants of said period of time are not the same as expected values.

16. The method according to claim 6, further comprising testing whether said count falls within or outside a preset range of values and adjusting the driving of the coil only if the count falls outside said range of values.

* * * * *